US012294976B2

(12) United States Patent
Lyu et al.

(10) Patent No.: US 12,294,976 B2
(45) Date of Patent: *May 6, 2025

(54) METHOD AND DEVICE FOR PAGING (71) Applicant: QUECTEL WIRELESS SOLUTIONS CO., LTD., Shanghai (CN)

(72) Inventors: Ling Lyu, Shanghai (CN); Zheng Zhao, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/733,771

(22) Filed: Jun. 4, 2024

(65) Prior Publication Data
US 2024/0334391 A1 Oct. 3, 2024

Related U.S. Application Data

(63) Continuation of application No. 18/516,787, filed on Nov. 21, 2023, now Pat. No. 12,010,648, which is a continuation of application No. PCT/CN2021/123315, filed on Oct. 12, 2021.

(30) Foreign Application Priority Data

Sep. 28, 2021 (CN) .......................... 202111143867.9

(51) Int. Cl.
*H04W 68/00* (2009.01)
(52) U.S. Cl.
CPC ................. *H04W 68/005* (2013.01)

(58) Field of Classification Search
None
See application file for complete search history.

(56) References Cited

U.S. PATENT DOCUMENTS

| 10,959,206 | B2 | 3/2021 | Islam et al. | |
| 12,010,648 | B2 * | 6/2024 | Lyu | ...................... H04W 16/28 |
| 2017/0366236 | A1 | 12/2017 | Ryoo et al. | |

(Continued)

FOREIGN PATENT DOCUMENTS

| CN | 108282862 | 7/2018 |
| CN | 109151849 | 1/2019 |

(Continued)

OTHER PUBLICATIONS

International Search Report and Written Opinion in International Appln. No. PCT/CN2021/123315, mailed on Apr. 25, 2022, 17 pages (with English machine translation).

(Continued)

*Primary Examiner* — Gary Lafontant
(74) *Attorney, Agent, or Firm* — Fish & Richardson P.C.

(57) ABSTRACT

The present disclosure provides a method and a device for paging. A network device sends paging indication information including identification information to a plurality of terminal devices corresponding to a same beam. A first terminal device of the plurality of terminal devices determines whether it is paged by the network device according to the identification information. In response to the first terminal device being paged by the network device, the first terminal device sends a paging response message to the network device.

20 Claims, 5 Drawing Sheets

(56) References Cited

U.S. PATENT DOCUMENTS

| | | |
|---|---|---|
| 2018/0199309 A1 | 7/2018 | Islam et al. |
| 2021/0037499 A1 | 2/2021 | Mazloum et al. |
| 2021/0099843 A1 | 4/2021 | Yang et al. |

FOREIGN PATENT DOCUMENTS

| | | |
|---|---|---|
| CN | 109392090 | 2/2019 |
| CN | 110169156 | 8/2019 |
| KR | 20180045163 | 5/2018 |
| WO | WO 2019006807 | 1/2019 |
| WO | WO 2022184233 | 9/2022 |

OTHER PUBLICATIONS

Mediatek Inc., "Overhead Reduction for Paging in Multi-beam Operation," 3GPP TSG-RAN WG2 Meeting #101, R2-1801955, Athens, Greece, Feb. 26,-Mar. 2, 2018, 5 pages.

Office Action in Chinese Appln. No. 202111143867.9, mailed on Apr. 14, 2022, 24 pages (with English machine translation).

Office Action in Chinese Appln. No. 202111143867.9, mailed on Nov. 1, 2022, 17 pages (with English machine translation).

Extended European Search Report in European Appln No. 21959036.1, dated Sep. 16, 2024, 9 pages.

\* cited by examiner

METHOD AND DEVICE FOR PAGING

CROSS REFERENCE TO RELATED APPLICATIONS

This application is a continuation of U.S. patent application Ser. No. 18/516,787, filed on Nov. 21, 2023, which is a continuation of International Application No. PCT/CN2021/123315, filed on Oct. 12, 2021, which claims priority to Chinese Patent Application No. 202111143867.9, filed on Sep. 28, 2021. All of the afore-mentioned patent applications are hereby incorporated by reference in their entireties.

TECHNICAL FIELD

The present disclosure relates to the field of communication technology, and in particular to a method and a device for paging.

BACKGROUND

The fifth generation (5G) mobile standards have higher requirements for data transmission speed, number of connections, coverage ranges, or the like. The 5G standard aims to provide data rates of tens of megabits per second for each user of tens of thousands of users. Some wireless communication networks, such as 5G or subsequent technology evolution, should support operations in very high or even extremely high frequency (EHF) bands (such as millimeter wave (mmW) bands, the millimeter wave typically has a wavelength of 1 mm to 10 mm, or frequency of 30 to 300 gigahertz (GHz)). These extremely high frequencies require very high throughput. However, one of the challenges in wireless communication at very high or extremely high frequencies is that high frequencies may cause significant propagation losses. For example, in a mmW frequency band, propagation loss may be very severe.

Moreover, a device may have to perform beamforming in the analog domain when there are a large number of densely distributed antenna units, i.e. make beams to point to one direction at a specific moment, causing that a network device has to page terminal devices by frequently scanning beam groups focused in different directions. However, scanning the beam groups in different directions by the network device requires a significant amount of time, power consumption, and air resources. Therefore, it is urgent to find out how to page terminal devices with low consumption by the network device.

SUMMARY

The present disclosure provides a method and a device for paging, which can save power consumption for paging.

In the first aspect, some embodiments of the present disclosure provide a method for paging. The method includes:
  receiving, by a first terminal device of a plurality of terminal devices, paging indication information sent by a network device, where the paging indication information includes identification information of one or more terminal devices of the plurality of terminal devices being paged by the network device, and the plurality of terminal devices corresponds to a first beam;
  determining, by the first terminal device, whether the first terminal device is paged by the network device according to the identification information; and
  in response to the first terminal device being paged by the network device, sending, by the first terminal device, a paging response message to the network device, where the paging response message is configured to indicate that the first terminal device is a terminal device being paged by the network device.

In the above method, the first terminal device of the plurality of terminal devices corresponding to a same beam receives the paging indication information sent by the network device and including the identification information, and determines whether the first terminal device is paged by the network device according to the identification information. In response to the first terminal device being paged by the network device, the first terminal device sends the paging response message to the network device. In this way, the network device can only page the one or more terminal devices corresponding to the first beam, without need of paging the terminal devices corresponding to other beams, thereby saving power consumption for paging.

In some embodiments, the paging response message includes beam strength of a second beam. The beam strength of the second beam is strongest beam strength of beam strength of a plurality of beams detected by the first terminal device at a first moment, and the second beam is configured for the network device to determine a target beam matching with the first terminal device.

In some embodiments, the method further includes: determining, by the first terminal device, the beam strength of the second beam included in the paging response message according to beam strength of the second beam detected at a second moment, the beam strength of the second beam detected at the first moment and a forgetting factor, where the second moment is a previous moment of the first moment.

In some embodiments, the method further includes: receiving, by the first terminal device, a physical downlink control channel (PDCCH) and a physical downlink shared channel (PDSCH) sent through the target beam.

In some embodiments, the method further includes: receiving, by the first terminal device, a master information block (MIB) sent by the network device, where the MIB includes paging auxiliary information configured to indicate whether the network device supports group paging and a number of supported paging groups.

In some embodiments, the operation of receiving, by the first terminal device of the plurality of terminal devices, the paging indication information sent by the network device includes: in response to the paging auxiliary information indicating that the network device supports group paging, receiving, by the first terminal device, the paging indication information sent by the network device.

In some embodiments, the operation of receiving, by the first terminal device of the plurality of terminal devices, the paging indication information sent by the network device, includes: receiving, by the first terminal device, a paging message sent by the network device, where the paging message includes the paging indication information and paging resource information, and the paging resource information is configured to indicate a size of a resource required by the network device.

In some embodiments, the method further includes: determining, by the first terminal device, an uplink resource according to the paging resource information. In response to the first terminal device being paged by the network device, the operation of sending, by the first terminal device, the paging response message to the network device, includes: sending, by the first terminal device, the paging response message to the network device, where the paging response message is further configured to indicate the uplink resource.

In the second aspect, some embodiments of the present disclosure provide a method for paging. The method includes:
- sending, by a network device, paging indication information to a plurality of terminal devices, where the paging indication information includes identification information of one or more terminal devices of the plurality of terminal devices being paged by the network device, and the plurality of terminal devices corresponds to a first beam;
- receiving, by the network device, paging response message sent by a first terminal device of the plurality of terminal devices; and
- paging, by the network device, the first terminal device according to the paging response message sent by the first terminal device.

In the above method, the network device sends the paging indication information including the identification information to the plurality of terminal devices corresponding to a same beam, so that a respective terminal device of the plurality of terminal devices determines whether the respective terminal device is paged by the network device according to the identification information. In response to the first terminal device being paged by the network device, the first terminal device sends the paging response message to the network device. In this way, the network device can only page the one or more terminal devices corresponding to the first beam, without need of paging the terminal devices corresponding to other beams, thereby saving power consumption for paging.

In some embodiments, the paging response message includes beam strength of a second beam, where the beam strength of the second beam is strongest beam strength of beam strength of a plurality of beams detected by the first terminal device at a first moment. The method further includes:
- determining, by the network device, a target beam matching with the first terminal device according to the beam strength of the second beam.

In some embodiments, the method further includes:
- sending, by the network device, a PDCCH and a PDSCH to the first terminal device through the target beam.

In some embodiments, before the operation of sending, by the network device, the paging indication information to the plurality of terminal devices, the method further includes: sending, by the network device, a MIB to the plurality of terminal devices, where the MIB includes paging auxiliary information configured to indicate whether the network device supports group paging and a number of supported paging groups.

In some embodiments, the operation of sending, by the network device, the paging indication information to the plurality of terminal devices, includes:
- sending, by the network device, a paging message to the plurality of terminal devices, where the paging message includes the paging indication information and paging resource information, and the paging resource information is configured to indicate a size of a resource required by the network device.

In some embodiments, the paging response message is further configured to indicate an uplink resource determined according to the paging resource information.

In the third aspect, some embodiments of the present disclosure provide a device for radio communication, herein the device may be a terminal device or a chip of the terminal device. The device has the functions of the terminal device which can implement the various embodiments according to the above-mentioned first aspect. These functions may be implemented by hardware or software executed by corresponding hardware. The hardware or software includes one or more modules corresponding to the above-mentioned functions.

In some embodiments, the device includes a transceiver module and a processing module. For example, the transceiver module may be at least one of a transceiver, a receiver, or a transmitter. In some embodiments, the transceiver module may include a radio frequency (RF) circuit or an antenna. The processing module may be a processor. In some embodiments, the device further includes a storage module, which may be, for example, a memory. When the device includes the storage module, the storage module is configured to store instructions or data. In some embodiments, the processing module is connected to the storage module, and the processing module can execute instructions stored in the storage module or obtained from other sources, so that the device implements the communication methods according to the various embodiments in the above-mentioned first aspect.

In some embodiments, when the device is a chip, the chip may include: a transceiver module and a processing module. For example, the transceiver module may be input/output interfaces, pins, or circuits of the chip. The processing module may be a processor, for example. In some embodiments, the processing module enables the chip to implement the methods according to the various embodiments in the above-mentioned first aspect. In some embodiments, the processing module can execute instructions stored in the storage module or call information such as data stored in the storage module. The storage module may be a storage module integrated in the chip, such as a register, a cache, or the like. The storage module also may be disposed in the communication device, but outside the chip, such as a read-only memory (ROM) or a static storage elements of other types that can store static information and instructions, such as a random access memory (RAM), or the like.

Any of the above-mentioned processors may be an all-purpose central processing unit (CPU), a microprocessor, an application-specific integrated circuit (ASIC), or one or more integrated circuits configured to control the execution of programs according to the various embodiments in the above-mentioned first aspect.

In the fourth aspect, some embodiments of the present disclosure provide a device for radio communication, herein the device may be a network device or a chip of the network device. The device has the functions of the network device which can implement the various embodiments according to the above-mentioned second aspect. These functions may be implemented by hardware or software executed by corresponding hardware. The hardware or software includes one or more modules corresponding to the above-mentioned functions.

In some embodiments, the device includes: a transceiver module and a processing module. For example, the transceiver module may be at least one of a transceiver, a receiver, or a transmitter. In some embodiments, the transceiver module may include a RF circuit or an antenna. The processing module may be a processor. In some embodiments, the device further includes a storage module, which may be, for example, a memory. When the device includes the storage module, the storage module is configured to store instructions or data. In some embodiments, the processing module is connected to the storage module, and the processing module can execute instructions stored in the storage module or obtained from other sources, so that the device implements the methods according to the various embodiments in the above-mentioned second aspect.

In some embodiments, when the device is a chip, the chip may include: a transceiver module and a processing module. For example, the transceiver module may be input/output interfaces, pins, or circuits of the chip. The processing module may be a processor, for example. In some embodiments, the processing module enables the chip to implement the methods according to the various embodiments in the above-mentioned second aspect. In some embodiments, the processing module can execute instructions stored in the storage module or call information such as data stored in the storage module. The storage module may be a storage module integrated in the chip, such as a register, a cache, or the like. The storage module also may be disposed in the communication device, but outside the chip, such as a ROM or a static storage elements of other types that can store static information and instructions, such as a RAM, or the like.

Any of the above-mentioned processors may be an all-purpose CPU, a microprocessor, an ASIC, or one or more integrated circuits configured to control the execution of programs according to the various embodiments in the above-mentioned second aspect.

In the fifth aspect, some embodiments of the present disclosure provide a non-transitory computer-readable storage medium. The computer-readable storage medium is configured to store program codes including instructions for implementing the methods according to the various embodiments in the above-mentioned first or second aspect.

In the sixth aspect, some embodiments of the present disclosure provide a computer program product including instructions, which, when executed by a computer, cause the computer to implement operations of the methods according to the various embodiments in the above-mentioned first or second aspect.

In the seventh aspect, some embodiments of the present disclosure provide a communication system. The communication system includes a device configured for implementing the methods according to the various embodiments in the above-mentioned first aspect and a device configured for implementing the methods according to the various embodiments in the above-mentioned second aspect.

In the eighth aspect, some embodiments of the present disclosure provide a processor coupled to a memory. The processor is configured to implement the methods according to the various embodiments in the above-mentioned first or second aspect.

In the ninth aspect, some embodiments of the present disclosure provide a chip including a processor and an interface circuit. The interface circuit is configured to receive signals transmitted by communication devices other than the communication device and transmit the signals to the processor, or to transmit signals coming from the processor to the communication devices other than the communication device. The processor is configured to implement the methods according to the various embodiments in the above-mentioned first or second aspect by logical circuits or executing code instructions.

In some embodiments, the chip may further include a memory configured to store instructions. The processor is configured to execute instructions stored in the memory or obtained from other sources. When the instructions are executed, the processor implements the methods according to the various embodiments in the above-mentioned first or second aspect.

In some embodiments, the chip may be integrated in a terminal device or a network device.

DETAILED DESCRIPTION OF THE EMBODIMENTS

The following will describe the technical solutions of the present disclosure in conjunction with the accompanying drawings.

The technical solutions according to embodiments of the present disclosure are applicable to various communication systems, such as global system for mobile communications (GSM) system, code division multiple access (CDMA) system, wideband code division multiple access (WCDMA) system, general packet radio service (GPRS) system, long term evolution (LTE) system, LTE frequency division duplex (FDD) system, LTE time division duplex (TDD) system, universal mobile telecommunications system (UMTS), worldwide interoperability for microwave access (WiMAX) communication system, future 5th generation (5G) system, new radio (NR) system, or the like.

For the convenience of understanding the embodiments of the present disclosure, first of all, a communication system according to embodiments of the present disclosure is illustrated in detail with reference to FIGS. 1 and 2.

Figure 1:
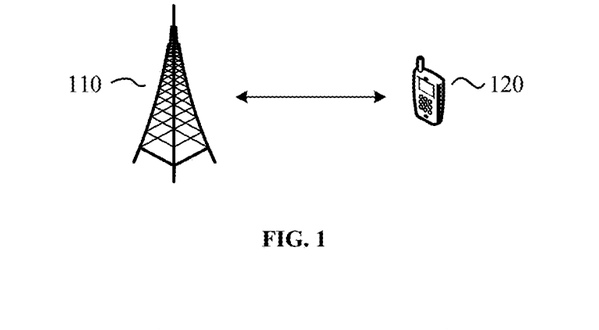
FIG. 1 shows a schematic diagram of a communication system according to some embodiments of the present disclosure.

FIG. 1 shows a schematic diagram of the communication system 100 applicable to the method and device for paging according to embodiments of the present disclosure. As shown in FIG. 1, the communication system 100 may include a network device, such as the network device 110 as shown in FIG. 1. The communication system 100 may further include at least one terminal device, such as the terminal device 120 as shown in FIG. 1. The network device 110 and the terminal device 120 may communicate with each other through a wireless link.

Figure 2:
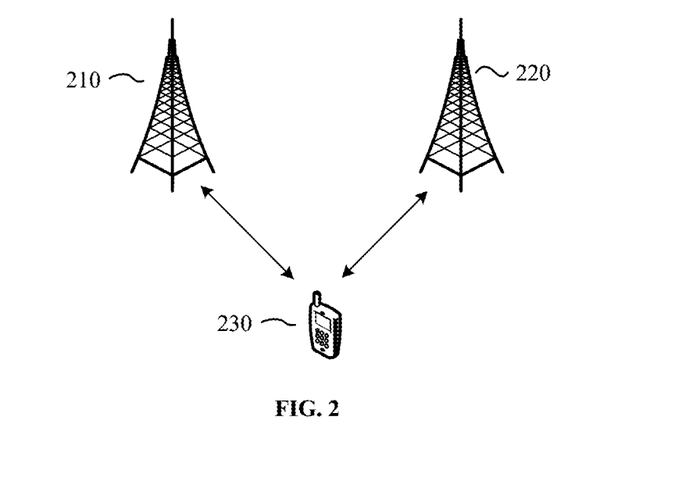
FIG. 2 shows a schematic diagram of another communication system according to some embodiments of the present disclosure.

FIG. 2 shows a schematic diagram of another communication system 200 applicable to the method and device for paging according to embodiments of the present disclosure.

As shown in FIG. 2, the communication system 200 may include at least two network devices, such as the network devices 210 and 220 as shown in FIG. 2. The communication system 200 may further include at least one terminal device, such as the terminal device 230 as shown in FIG. 2. The terminal device 230 may establish a wireless link with the network devices 210 and 220 using dual connectivity (DC) technology or multi-connectivity technology. In some embodiments, the network device 210 may be a primary base station, and the network device 220 may be a secondary base station. In this case, the network device 210 is the network device to which the terminal device 230 initially accesses, and the network device 210 is responsible for radio resource control (RRC) communication with the terminal device 230. The network device 220 may be added during RRC reconfiguration and configured to provide additional wireless resources.

Of course, the network device 220 may also be a primary base station, and the network device 210 may also be a secondary base station, which will not be specifically limited in the present disclosure. Moreover, FIG. 2 illustrates the wireless connections between only two network devices and the terminal device for ease of understanding, but this should not constitute any limitation on the scenarios to which the present disclosure is applicable. The terminal device may establish wireless links with further network devices.

Each of the communication devices, such as the network device 110 or the terminal device 120 in FIG. 1, or the network device 210, the network device 220, or the terminal device 230 in FIG. 2, may be equipped with a plurality of antennas. The plurality of antennas may include at least one transmitting antenna for transmitting signals and at least one receiving antenna for receiving signals. Moreover, each of the communication devices additionally includes a transmitter chain and a receiver chain. Those skilled in the art should understand that the transmitter chain and the receiver chain may each include a plurality of components related to signal transmission and reception (such as processors, modulators, multiplexers, demodulators, demultiplexers, antennas, and the like). Therefore, the network devices may communicate with the terminal device using multi-antenna technology.

It should be understood that the network device in the wireless communication system may be any device having wireless transmission and reception functions. The device includes but is not limited to: an evolved Node B (eNB), a radio network controller (RNC), a Node B (NB), a base station controller (BSC), a base transceiver station (BTS), a home evolved NodeB or home Node B (HNB), a baseband unit (BBU), an access point (AP), a wireless relay node, a wireless backhaul node, a transmission point (TP), or a transmission and reception point (TRP) in a wireless fidelity (WIFI) system, or the like. The device also may be a gNB or a transmission point (TRP or TP) in a 5G, such as NR, system, one or a group of antenna panels (including a plurality of antenna panels) of a base stations in a 5G system, or may be a network node functioning as a gNB or a transmission point, such as a BBU, a distributed units (DU), or the like.

In some deployments, a gNB may include a centralized unit (CU) and a DU. The gNB may further include a radio unit (RU). The CU implements some of the functions of the gNB, and the DU implements some other functions of the gNB. For example, the CU implements the functions of RRC and packet data convergence protocol (PDCP) layer, and the DU implements the functions of radio link control (RLC) layer, media access control (MAC) layer and physical (PHY) layer. Due to the fact that the information in the RRC layer finally becomes the information in the PHY layer, or originates from the information in the PHY layer, in this architecture, high-level signaling, such as signaling in RRC layer, may be considered to be sent by the DU or by the DU and the CU. It should be understood that the network device may be a CU node, a DU node, or a device that includes the CU node and the DU node. Moreover, the CU may be a network device in the radio access network (RAN) or a network device in the core network (CN), which will not be specifically limited in the present disclosure.

It should also be understood that the terminal device in the wireless communication system may also be referred to as a user equipment (UE), an access terminal, a user unit, a user station, a mobile radio station, a mobile station, a remote station, a remote terminal, a mobile device, a user terminal, a terminal, a wireless communication device, a user proxy, or a user device. The terminal device in the embodiments of the present disclosure may be a mobile phone, a tablet (or pad), a computer having wireless transmission and reception functions, a virtual reality (VR) terminal device, an augmented reality (AR) terminal device, a wireless terminal in industrial control, a wireless terminal for self driving, a wireless terminal for remote medical, a wireless terminal in smart grids, a wireless terminal for transportation safety, a wireless terminal for smart city, a wireless terminal for smart home, and the like. Embodiments of the present disclosure do not specifically limit the application scenarios.

In order to facilitate the understanding of the embodiments of the present disclosure, first of all, several terms involved in the present disclosure will be briefly introduced.

1. Beams: in NR protocols, a beam may be embodied as a spatial filter, also referred to as a spatial filter or spatial parameters. The beam configured for transmitting signals may be referred to as a transmission beam (Tx beam), a spatial domain transmission filter, or a spatial domain transmission parameter. The beam configured to receive signals may be referred to as a reception beam (Rx beam), a spatial domain receive filter or a spatial domain receive parameter.

The transmission beam may refer to the distribution of signal strength formed by the signals transmitted by an antenna and in different spatial directions, and the reception beam may refer to the distribution of signal strength formed by the signals received by the antenna and in different spatial directions.

It should be understood that the embodiments of beams in the NR protocols listed above are only examples and should not constitute any limitations in the present disclosure. The present disclosure does not exclude the possibility of defining other terms to represent the same or similar meanings in future protocols.

Moreover, the beam may be a wide beam, a narrow beam, or a beam of other types. The technology for forming the beam may be beamforming technology or other technologies. The beamforming technology may include digital beamforming technology, analog beamforming technology, or hybrid digital/analog beamforming technology. Different beams may be considered to correspond to different resources. Different beams may be configured to send the same or different information.

In some embodiments, a plurality of beams having the same or similar communication characteristics may be considered as one beam. A beam may include one or more antenna ports for transmitting data, controlling signaling, or detecting signals. One or more antenna ports that form a beam may also be considered as a set of antenna ports.

2. Beamforming: the 5G communication systems extend the multiple-input multiple-output (MIMO) in the LTE communication systems. In LTE communication systems, MIMO may have up to 8 antennas, while in 5G communication systems, MIMO may have 16/32/64/128 antennas, which is known as "massive" MIMO. Therefore, it may be considered that the massive MIMO refers to the beams of a large number of antennas. The massive MIMO and beamforming complement each other. The massive MIMO is responsible for aggregating more and more antennas at both the sending and receiving ends, and beamforming is responsible for guiding each signal to the optimal path of the terminal receiver, thereby improving signal strength, preventing signal interference, and thus improving communication quality.

For example, a base station may have an antenna array with several rows and several columns of antenna ports and configured for beamforming in the communication with a UE. Signals may be transmitted for a plurality of times in different directions (for example, different beamforming may be performed on each signal for transmission). The mmW receiver may attempt a plurality of beams (for example, antenna subarrays) when receiving synchronous signals. In some cases, the antennas of a base station or a UE may be located within one or more antenna arrays supporting beamforming or MIMO operations. One or more antennas or antenna arrays of a base station may be co-located at an antenna assembly (such as antenna towers). The antennas or antenna arrays associated with the base station may be located in different geographical locations. The base station may use a plurality of antennas or antenna arrays for beamforming, in order to implement directional communication with a UE.

In beamforming, a plurality of antennas may be used to obtain a narrow beam in a specific orientation. The more antennas used in beamforming, the higher the directivity of the narrow beam. Both the network device and the terminal device can form transmission or reception beams having high directivity using a plurality of transmission or reception antennas, and efficient data transmission can only occur when the transmission and reception beams are in approximately the same directions.

In order to effectively manage the directions of the transmission beam and reception beam, a beam management mechanism is introduced. The beam management mechanism is used to align the direction of the transmission beam with the direction of the reception beam, also known as beam matching, or beam pairing. For mismatched transmission beam and reception beam, rapid recovery can be achieved using the beam management mechanism. In general, communication of the carriers in high frequency band, such as those in frequency band of frequency range (FR) 2, requires beamforming and the beam management mechanism.

3. Beam matching relationship: i.e., the matching relationship between the transmission beam and reception beam, in other words, the matching relationship between the spatial domain transmit filter and the spatial domain receive filter. Significant beamforming gains can be obtained by transmitting signals using the transmission beam and reception beam having the beam matching relationship.

In some embodiments, the beam matching relationship between a transmitting end and a receiving end may be obtained by beam training. For example, the transmitting end may send a reference signal in a way of beam scanning, and the receiving end may receive the reference signal also in the way of beam scanning. The transmitting end may form a plurality of beams having different directivities in spatial domain using beamforming, and may poll the plurality of beams having different directivities to transmit the reference signal through the plurality of beams having different directivities, so that the power of the reference signal transmitted in the orientation of the transmission beam is maximized. At this case, the orientation of the transmission beam may be referred to as the direction of the transmission beam. The receiving end may also form a plurality of beams having different directivities in spatial domain using beamforming, and may poll the plurality of beams having different directivities to receive the reference signal through the plurality of beams having different directivities, so that the power of the reference signal received in the orientation of the reception beam by the receiving end is maximized. At this case, the orientation of the reception beam may be referred to as the direction of the reception beam.

By traversing each transmission beam and reception beam, the receiving end may perform channel measurements based on the received reference signal, and report the results of the measurements to the transmitting end using CSI. For example, the receiving end may report a portion of reference signal resources having relatively high reference signal receiving power (RSRP) to the transmitting end, for example the identification of the reference signal resources is reported, so that the transmitting end selects beam pairing relationships with relatively high channel quality to transmit and receive data or signaling.

4. Reference signals and reference signal resources: a reference signal may be used for channel measurement, channel estimation, or the like. A reference signal resource may be used to configure the transmission properties of the reference signal, such as locations of time-frequency resources, mapping relationships of ports, power factors, scrambling codes, and the like. The transmitting device may send the reference signal based on the reference signal resource, and the receiving device may receive the reference signal based on the reference signal resource.

The channel measurements involved in the present disclosure also includes beam measurements, i.e. obtaining beam quality information by measuring the reference signal, and the parameters used to evaluate beam quality include RSRP, but are not limited to this. For example, beam quality may also be evaluated by parameters such as reference signal receiving quality (RSRQ), signal noise ratio (SNR), signal to interference plus noise ratio (SINR), or the like. For the convenience of description, unless otherwise specified, the channel measurements involved in the embodiments of the present disclosure refer to beam measurements.

The reference signal may include, for example, a channel state information reference signal (CSI-RS), a synchronization signal block (SSB), and a sounding reference signal (SRS). Correspondingly, the reference signal resource may include a CSI-RS resource, a SSB resource, and a SRS resource.

For example, SSBs are repeated in a preset direction (beam) within a window of 5 ms in the time domain, a NR cell uses beam scanning to send the SSBs, and orientations of the SSB beams in the spatial domain are different from each other. During searching of cells by the UE, the UE measures all SSBs in a SSB burst set and finds out the SSB having the best signals. In this way, the base station can know the downlink beams selected by the terminal device by random access, because at a specific moment, a beam has only one orientation. The downlink data sent to the terminal devices in different directions should be sent at different moments. The reception beam can receive data in only one orientation at a certain moment. In this way, initial beam pairs are established between the base station and the terminal devices.

It should be noted that the above-mentioned SSB may also be referred to as a synchronization signal/physical broadcast channel block (SS/PBCH block), and the corresponding SSB resource may also be referred to as a SS/PBCH block resource, which may be abbreviated as a SSB resource.

In order to distinguish different reference signal resources, each reference signal resource may correspond to an identifier for reference signal resource, such as CSI-RS resource indicator (CRI), SSB resource indicator (SSBRI), and SRS resource index (SRI).

The SSB resource indicator may also be referred to as a SSB index.

In the embodiments of the present disclosure, "resources" may refer to "time-domain resources and/or frequency-domain resources and/or spatial-domain resources". The time-domain resources may be one or more symbols or one or more time slots. The frequency-domain resources may be one or more resource blocks (RBs), one or more resource elements (REs), or one or more carriers. The spatial domain refers to the spatial directions, and the spatial-domain resources may be one or more beam directions, or the like, which will not be specifically limited in the embodiments of the present disclosure.

It should be understood that the above-mentioned reference signals and the corresponding reference signal resources are only illustrative examples and should not constitute any limitations in the present disclosure. The present disclosure does not exclude the possibility of defining other reference signals to achieve the same or similar functions in future protocols.

5. Cells: a cell is defined in a high-level perspective of resource management, mobility management, or service units. The coverage range of each network device may be referred to as one or more service cells, and each service cell may be regarded as composed of some certain frequency-domain resources.

It should be noted that a cell may refer to an area within the coverage range of the wireless network of the network device. In the embodiments of the present disclosure, different cells may correspond to different network devices. For example, the network device for a cell #1 and the network device for a cell #2 may be different network devices, such as base stations. That is to say, the cell #1 and the cell #2 may be managed by different base stations. In this case, it may be said that the cell #1 and the cell #2 do not share a base station, or have different base stations. The network device for the cell #1 and the network device for the cell #2 also may be different RF processing units of a same base station, such as radio remote unit (RRU). That is to say, the cell #1 and the cell #2 may be managed by a same base station, and have the same baseband processing unit and intermediate frequency processing unit, but have different RF processing units, which will not be specifically limited in the embodiments of the present disclosure.

It should be understood that in the embodiments described below, "first", "second", and various numerical numbers are only for the convenience of description and are not intended to limit the scope of the embodiments of the present disclosure. For example, they are used to distinguish different CSI reports, different indicator information, or the like.

In traditional solutions, a network device has to page terminal devices by frequently scanning beam groups focused in different directions. However, scanning the beam groups in different directions by the network device requires a significant amount of time, power consumption, and air resources. Therefore, it is urgent to find out how to page terminal devices with low consumption by the network device.

Figure 3:
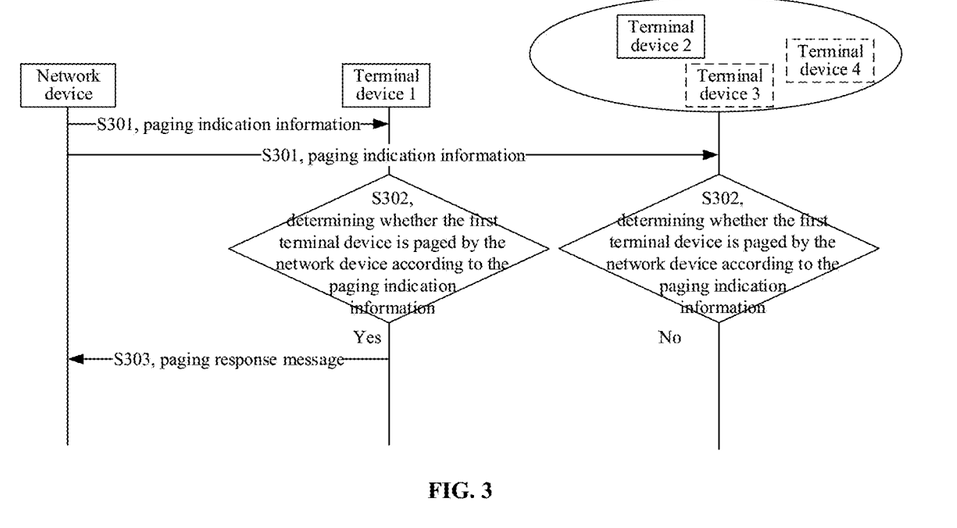
FIG. 3 shows a schematic flow chart of a method for paging according to some embodiments of the present disclosure.

FIG. 3 shows a schematic flow chart of a method for paging according to some embodiments of the present disclosure.

At S301, the network device sends paging indication information to a plurality of terminal devices. The paging indication information includes identification information of one or more terminal devices of the plurality of terminal devices being paged by the network device, and the plurality of terminal devices corresponds to a first beam. Accordingly, each terminal device of the plurality of terminal devices corresponding to the first beam can receive the paging indication information.

Figure 4:
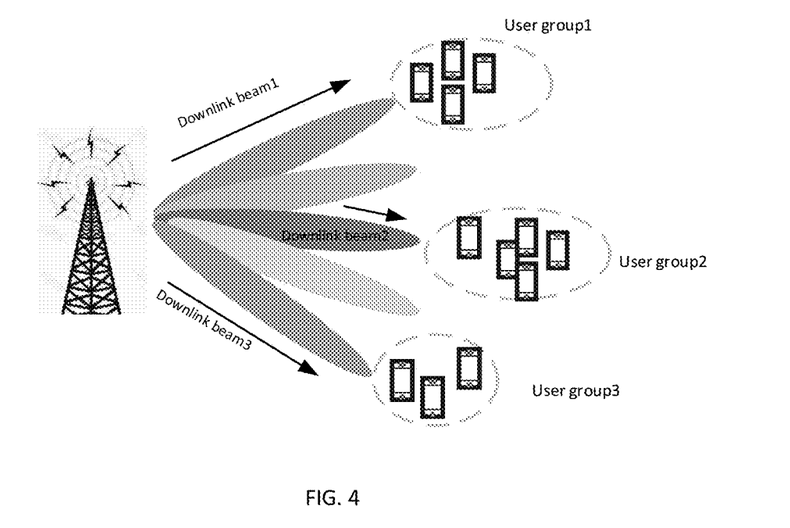
FIG. 4 shows a schematic diagram of paging groups according to some embodiments of the present disclosure.
Figure 5:
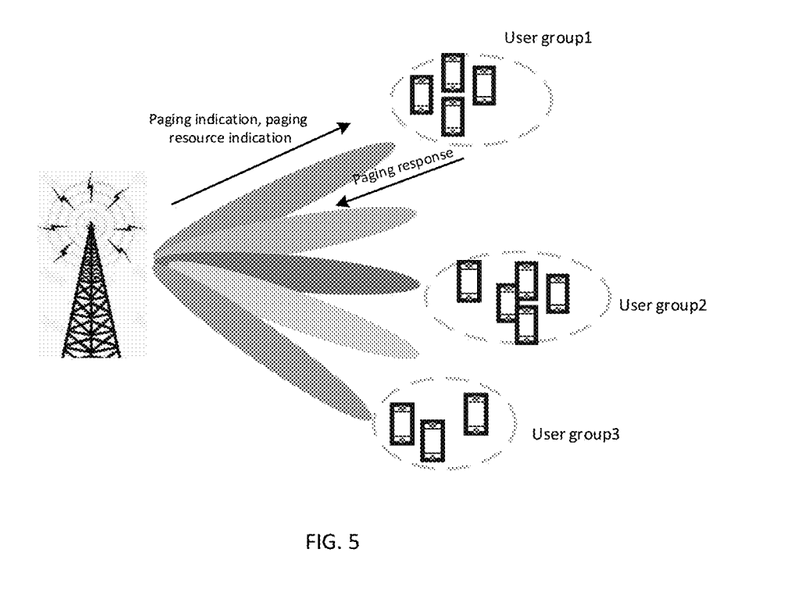
FIG. 5 shows a schematic diagram of a paging process according to some embodiments of the present disclosure.

The network device may make groups for all terminal devices in the managed cell based on the downlink beams. The plurality of terminal devices corresponding to a same downlink beam (for example, the first beam) belong to a same group. For example, as shown in FIG. 4, the network device manages 12 terminal devices, which are divided into 3 user groups, and the terminal devices in each user group correspond to a same downlink beam. That is to say, at S301, the network device may send the paging indication information to the 4 terminal devices in user group 1 based on downlink beam 1. In this way, the network device may only page the 4 terminal devices corresponding to the downlink beam 1, without need of paging the terminal devices corresponding to downlink beam 2 and downlink beam 3.

It should be understood that in the embodiments of the present disclosure, each network device can manage terminal devices based on different group. For the convenience of description, the following embodiments are described using one network device as an example.

It should be noted that when establishing connections between the terminal devices and the network device, the network device stores the identification information (such as international mobile subscriber identity (IMSI), temporary mobile subscriber identity (TMSI), or the like) of all terminal devices within the managed cell. Upon the terminal devices and the network device have established initial beam pairs, the network device has been informed of the corresponding relationship between each terminal device and the downlink beam.

In some embodiments, the paging indication information may be carried in any of time reference signal (TRS), primary synchronization signal (PSS), secondary synchronization signal (SSS), or broadcast synchronization channel (BSCH).

When a core network device or a base station initiates paging, the network sends the paging indication information by configuring corresponding downlink beams. The paging indication information may be carried in any of TRS, PSSS, SSS, or BSCH. The TRS includes a plurality of NZP-CSI-RSs, which may be configured as semi-continuous, non-periodic, or periodic signals.

In some embodiments, before S301, the network device may determine whether itself supports group paging and a size of groups supported by the accessing cell, and send a master information block (MIB) to the plurality of terminal devices. The MIB includes paging auxiliary information configured to indicate whether the network device supports group paging and the size of the groups supported by the accessing cell.

The network device may send broadcast information (such as MIB, SIB), the MIB and SIB are configured to inform whether the network device supports group paging of terminal devices. For example, 1 bit of the 11-bit-information is reserved in the MIB, this 1 bit is configured to carry the group paging indicate. By receiving the MIB, a terminal device can determine whether the network device supports group paging under the indication of this 1 bit.

In response to the network device supporting group paging, the paging auxiliary information indicates that the network device supports group paging, after receiving the paging indication information, each terminal device of the plurality of terminal devices performs the operation S301. In response to the network device not supporting group paging, the paging auxiliary information indicates that the network device does not support group paging, after receiving the paging indication information, the plurality of terminal devices do not perform the operation S301.

In some embodiments, the operation S301 may include sending, by the network device, a paging message to the plurality of terminal devices. The paging indication information may be carried by the paging message. Accordingly, each terminal device of the plurality of terminal devices receives the paging message and acquires the paging indication information from the paging message.

In some embodiments, the paging message further includes paging resource information configured to indicate a size of a resource required by the network device.

At S302, the first terminal device of the plurality of terminal devices determines whether the first terminal device is paged by the network device according to the identification information.

Each terminal device of the plurality of terminal devices that receive the paging indication information sent by the network device determines whether itself is paged by the network device. In the following embodiments, a first terminal device (such as the terminal device 1 as shown in FIG. 3) of the plurality of terminal devices is taken as an example.

In some embodiments, the paging indication information includes identification information of one or more terminal devices of the plurality of terminal devices being paged by the network device. The identification information may be the identities (ID) of the one or more terminal devices, such as UE-ID information associated to TMSI and/or IMSI, or the like.

At S303, in response to the first terminal device being paged by the network device, the first terminal device sends a paging response message to the network device. The paging response message is configured to indicate that the first terminal device is a terminal device being paged by the network device. Accordingly, the network device receives the paging response message.

It should be understood that in response to the first terminal device being not paged by the network device, the first terminal device does not send the paging response message to the network device. For example, when the terminal device 2 in FIG. 3 determines that the network device does not page the terminal device 2, the terminal device 2 does not send the paging response message to the network device.

Thus, the first terminal device of the plurality of terminal devices corresponding to a same beam receives the paging indication information sent by the network device and including the identification information, and determines whether the first terminal device is paged by the network device according to the identification information. In response to the first terminal device being paged by the network device, the first terminal device sends the paging response message to the network device. In this way, the network device can only page the one or more terminal devices corresponding to the first beam, without need of paging the terminal devices corresponding to other beams, thereby saving power consumption for paging.

In some embodiments, the first terminal device may determine an uplink resource according to the paging resource information, and indicate the uplink resource in the paging response message.

Figure 6:
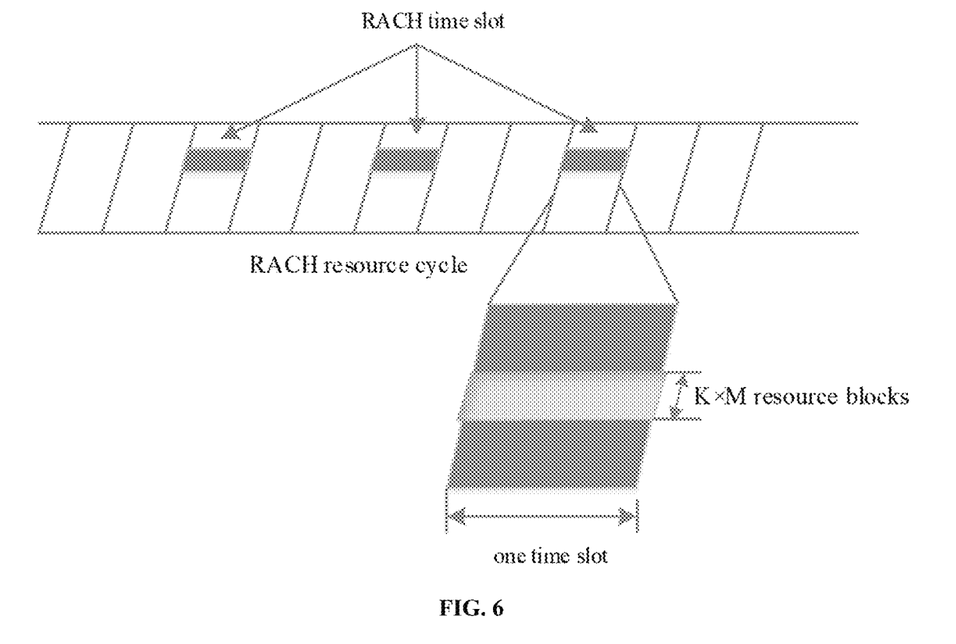
FIG. 6 shows an example of a structure of a video resource according to some embodiments of the present disclosure.

The uplink resource indicated in the paging response message may be a resource occupying one bit or a plurality of bits of k×M resource blocks in the random access channel (RACH) for uplink resources (for example, as shown in FIG. 6). Alternatively, the uplink resource indicated in the paging response message is carried in uplink control information (UCI) of a physical uplink control channel (PUCCH). For example, the PUCCH carries uplink control information from UE to a base station, the uplink control information may be channel state information (CSI), acknowledgement information (ACK/NACK) of hybrid automatic repeat request (HARQ), or scheduling request (SR). The PUCCH supports beamforming, and resource indication information is associated with each other by configuring the PUCCH and downlink paging indication signals. That is to say, the PUCCH may use the beam of the terminal device configured to receive downlink association signal for uplink transmission. In this process, MAC control unit is configured to indicate which association relationship is currently used.

In some embodiments, the first terminal device may use the paging response message sent to the network device to carry beam strength of a second beam. The beam strength of the second beam is strongest beam strength of beam strength of a plurality of beams detected by the first terminal device at a first moment. Accordingly, upon receiving the paging response message, the network device determines a target beam matching with the first terminal device according to the beam strength of the second beam.

The second beam and the first beam may be a same beam, i.e. the beam through which the first terminal device matches with the network device does not change. Alternatively, the second beam and the first beam may be different beams, i.e. the beam through which the first terminal device matches with the network device has changed.

It should be understood that due to the mobility, rotation, and other reasons of the terminal device, it is necessary to regularly reassess whether the downlink beam is suitable. In other words, even if the terminal device is completely stationary, some moving objects in the surrounding environment may block or no longer block some certain beam pairs, making it necessary to adjust the beam pairs used to match the network device with the terminal device to obtain optimal service quality.

It should be noted that the network device may adjust the matching relationship between each beam and the terminal device according to the paging response message fed back by each terminal device. That is to say, the network device may re-group beams according to the matching relationships between different beams and the terminal device. In this way, the embodiments of the present disclosure can further save the power consumption of paging and improve the efficiency of paging.

In some embodiments, the first terminal device may determine the beam strength of the second beam to be reported according to beam strength of the second beam detected at a second moment, the beam strength of the second beam detected at the first moment and a forgetting factor. The second moment is a previous moment of the first moment.

The first terminal device may perform beam measurement on the downlink signal of each beam that can be received and report the measurement results (i.e. beam strength). In addition, the first terminal device may perform filtering processing on the beam strength to be reported. For example, the i-th beam is detected, by the first terminal device at time k, to have the strongest beam strength, the first terminal device determines the filtered beam strength $RSRP_i(k)$ of the i-th beam according to the strongest beam strength $RSRP'_i(k-1)$ detected at the moment k−1, the strongest beam strength $RSRP'_i(k)$ detected at the moment k and the forgetting factor:

$$RSRP_i(k)=\partial \times RSRP'_i(k)+(1-\partial)\times RSRP'_i(k-1).$$

$\partial$ is a decimal falling within [0,1] and may be referred to as a forgetting factor. The more $\partial$ approaches 1, the more credible and reliable the current measurement results are. The more $\partial$ approaches 0, the more credible and reliable the historical and cumulative measurement results are. Compared with the average method for historical values, the terminal device needs to store only one filtering result for each beam, and the credibility for historical results according to this method is as follows:

$\partial$, $\partial \times (1-\partial)$, $\partial^2$, $(1-\partial)$ . . . , which correspond to different moments k, k−1, k−2, . . . , respectively.

In some embodiments, the paging response message may include the filtered beam strength of the second beam, and the network device selects the target beam according to the filtered second beam.

In some embodiments, the paging response message includes filtered beam strength of the second beam and the forgetting factor. In this way, the network device determines before-filtering beam strength of the second beam according to the filtered beam strength of the second beam and the forgetting factor, thereby selecting the target beam according to the before-filtering second beam.

In some embodiments, after S303, the network device sends a PDCCH and a PDSCH to the first terminal device through the target beam.

In some embodiments, after S303, the network device may further send RRC signaling to the first terminal device. The RRC signaling is configured to indicate the beam used for transmitting the PDCCH and the PDSCH.

The RRC signaling includes index information of control resource set (CORESET) and index information of search space (SS). The index information of CORESET includes one or more ID indexes of CORESET, and the index information of search space may also include one or more ID indexes of search space. In this way, the index information of CORESET and the index information of search space may be associated with corresponding configuration information of the CORESET and the search space. The configuration information of each CORESET includes parameters configured to indicate the TCI state set which may include one or more TCI states, that is, configured to indicate the beams used to receive PDCCH. Moreover, the network device may activate a beam using MAC CE signaling which carries indication information of TCI status. The terminal device may determine the corresponding time-frequency resources for the PDCCH according to the CORESET corresponding to the TCI status carried by the MAC-CE signaling and the search space corresponding to the CORESET, and use the beam indicated by the TCI status to monitor downlink control information (DCI) on the time-frequency resources for the PDCCH.

Figure 7:
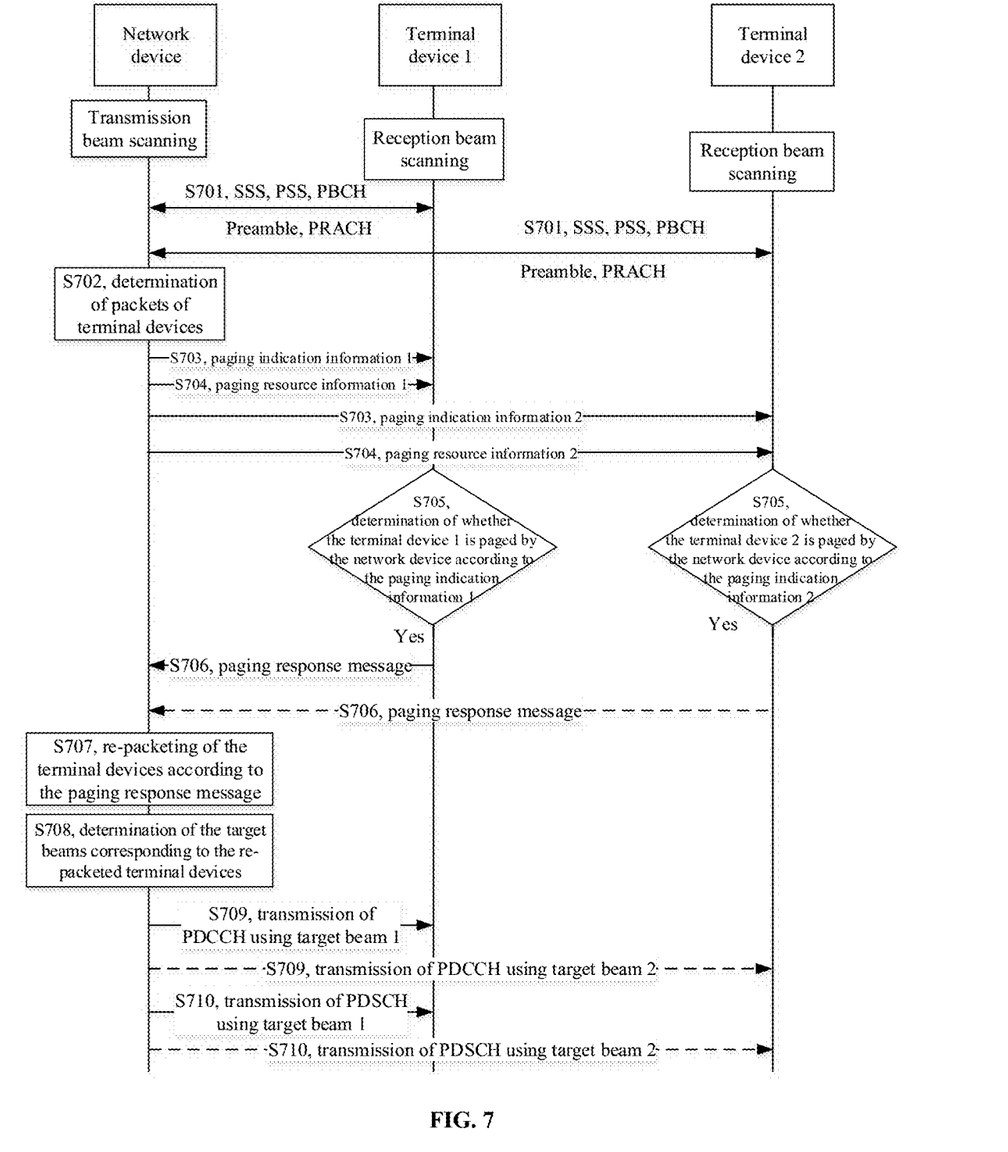
FIG. 7 shows a schematic flow chart of an exemplary method for paging of the present disclosure.

FIG. 7 shows a schematic flow chart of an exemplary method for paging of the present disclosure.

At S701, the network device performs beam pairing with terminal device 1 and terminal device 2, and establishes random access.

At S702, the network device make group of the terminal devices according to results of the beam pairing. For example, the group to which the terminal device 1 and the terminal device 2 belong, respectively, is determined. The following embodiments are illustrated taking the terminal device 1 in user group 1 and the terminal device 2 in user group 2 as an example.

At S703, when paging the terminal devices in the user group 1, the network device may send paging indication information 1 to all terminal devices in the user group 1. For example, the terminal device 1 in the user group 1 receives the paging indication information 1.

Accordingly, when paging the terminal devices in the user group 2, the network device may send paging indication information 2 to all terminal devices in the user group 2. For example, the terminal device 2 in the user group 2 receives the paging indication information 2.

At S704, the network device may further send paging resource indication information 1 to the terminal device 1, or send paging resource indication information 2 to the terminal device 2.

It should be understood that S703 and S704 may be performed concurrently. For example, the paging indication information and the paging resource indication information may be carried in a same message (such as a paging message).

At S705, the terminal device determines whether it is paged by the network device according to the paging indication information.

For example, the terminal device 1 determines whether it is paged by the network device according to the paging indication information 1, and the terminal device 2 determines whether it is paged by the network device according to the paging indication information 2.

At S706, in response to the terminal device 1 determining it is paged by the network device, the terminal device 1 sends a paging response message to the network device, or in response to the terminal device 1 determining it is not paged by the network device, the terminal device 1 does not send the paging response message to the network device. The paging response message carries the strongest beam strength.

Accordingly, in response to the terminal device 2 determining it is paged by the network device, the terminal device 2 sends a paging response message to the network device, or in response to the terminal device 2 determining it is not paged by the network device, the terminal device 2 does not send the paging response message to the network device.

At S707, the network device re-group the terminal devices according to the paging response messages.

For example, the network device receives the paging response message fed back by the terminal device 1 or the paging response message fed back by the terminal device 2, then the network device determines whether to adjust the beam group of the terminal devices according to the beam corresponding to the strongest beam strength in the paging response messages.

At S708, after re-group, the network device determines the target beams corresponding to new group.

At S709, the network device sends a PDCCH to the terminal device 1 through a target beam 1, and sends a PDCCH to the terminal device 2 through a target beam 2.

At S710, the network device sends a PDSCH to the terminal device 1 through the target beam 1, and sends a PDSCH to the terminal device 2 through the target beam 2.

It should be understood that at S705, in response to the terminal device 2 determining it is not paged by the network device, the method ends by S705.

The technical solution of the present disclosure may be applicable to wireless communication systems, such as the communication system 100 as shown in FIG. 1 or the communication system 200 as shown in FIG. 2. There may be a wireless communication connection relationship between two communication devices in the wireless communication system. One of these two communication devices may correspond, for example, to the network device 110 as shown in FIG. 1, such as the network device 110 or a chip in the network device 110, and the other of these two communication devices may correspond, for example, to the terminal device 120 in FIG. 1, such as the terminal device 120 or a chip in the terminal device 120. One of these two communication devices may correspond, for another example, to the network device 210 as shown in FIG. 2, such as the network device 210 or a chip in the network device 210, and the other of these two communication devices may correspond, for another example, to the terminal device 230 as shown in FIG. 2, such as the terminal device 230 or a chip in the terminal device 230. One of these two communication devices may correspond, for still another example, to the network device 220 as shown in FIG. 2, such as the network device 220 or a chip in the network device 220, and the other of these two communication devices may correspond, for still another example, to the terminal device 230 shown in FIG. 2, such as the terminal device 230 or a chip in the terminal device 230.

It should be understood that in order to achieve the functions in the above embodiments, the network device and the terminal devices include corresponding hardware structures and/or software modules for implementing each function. Those skilled in the art can be easily aware that the present disclosure can be implemented by hardware or a combination of hardware and computer software, in conjunction with the units and the operations of methods in each example described in the disclosed embodiments. Whether a certain function is implemented in hardware or the hardware driven by computer software depends on the specific application scenarios and design constraints of the technical solutions.

Figure 8:
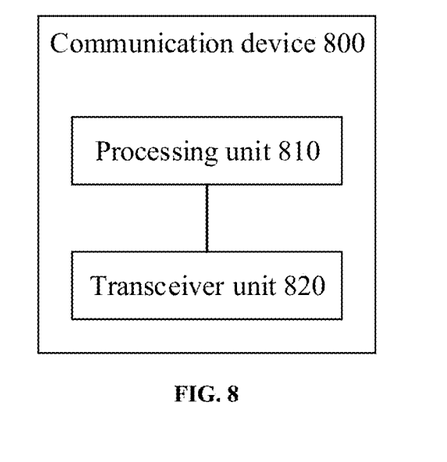
FIG. 8 shows a schematic diagram of a device for paging according to some embodiments of the present disclosure.
Figure 9:
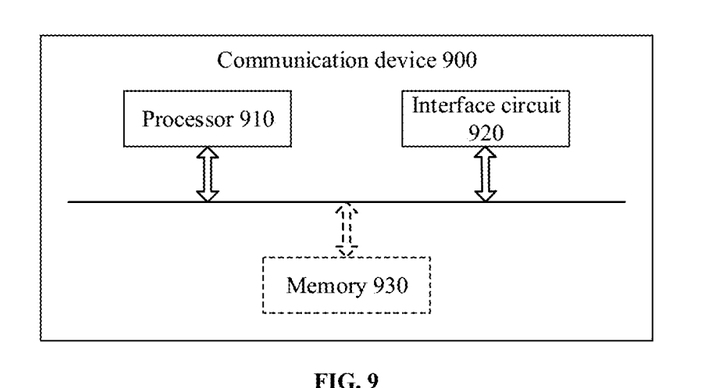
FIG. 9 shows a schematic diagram of another device for paging according to some embodiments of the present disclosure.

FIGS. 8 and 9 show a structural schematic diagram of a device for paging according to some embodiments of the present disclosure. These communication devices may be used to implement the functions of the terminal devices or the network device in the above method embodiments, thus also may achieve the beneficial effects of the above method embodiments. In the embodiments of the present disclosure, the communication device may be the terminal device 120 as shown in FIG. 1, or the network device 110 as shown in FIG. 1. Alternatively, the communication device may also be the terminal device 230 as shown in FIG. 2, or the network device 210 or the network device 220 as shown in FIG. 2. The communication device may also be a module (such as a chip) applied in the terminal devices or the network devices.

As shown in FIG. 8, the device for paging 800 includes a processing unit 810 and a transceiver unit 820. The communication device 800 is configured to implement the functions of the terminal devices or the network device in the method embodiments as shown in FIG. 3.

When the device for paging 800 is configured to implement the functions of the terminal devices in the method embodiments as shown in FIG. 3, the transceiver unit 820 is configured to receive the paging indication information sent by the network device. The paging indication information includes identification information of one or more terminal devices of a plurality of terminal devices being paged by the network device, and the plurality of terminal devices corresponds to a first beam. The processing unit 810 is configured to determine whether the first terminal device is paged by the network device according to the identification information. The transceiver unit 820 is further configured to send a paging response message to the network device in response to the first terminal device being paged by the network device. The paging response message is configured to indicate that the first terminal device is a terminal device being paged by the network device.

When the device for paging 800 is configured to implement the functions of the network device in the method embodiments as shown in FIG. 3, the transceiver unit 820 is configured to send paging indication information to a plurality of terminal devices. The paging indication information includes identification information of one or more terminal devices of the plurality of terminal devices being paged by the network device, and the plurality of terminal devices corresponds to a first beam. The transceiver unit 820 is further configured to receive paging response message sent by a first terminal device of the plurality of terminal devices. The processing unit 810 is configured to page the first terminal device according to the paging response message sent by the first terminal device.

More detailed description of the processing unit 810 and the transceiver unit 820 may be directly obtained by referring to the relevant description in the method embodiments as shown in FIG. 3, and will not be repeated here.

As shown in FIG. 9, the communication device 900 includes a processor 910 and an interface circuit 920. The processor 910 and the interface circuit 920 are coupled to each other. It should be understood that the interface circuit 920 may be a transceiver or an input/output interface. In some embodiments, the communication device 900 may further include a memory 930 configured to store instructions executed by the processor 910, input data required for the processor 910 to execute the instructions, or data generated after the processor 910 executes the instructions.

When the communication device 900 is configured to implement the method as shown in FIG. 3, the processor 910 is configured to implement the functions of the above-mentioned processing unit 810, and the interface circuit 920 is configured to implement the functions of the above-mentioned transceiver unit 820.

When the above communication device is a chip applied to the terminal device, the chip of the terminal device implements the functions of the terminal device in the above method embodiments. The chip of the terminal device receives information from other modules (such as RF modules or antennas) in the terminal device, where the information is sent by the network device to the terminal device. Alternatively, the chip of the terminal device sends information to other modules (such as RF modules or antennas) in the terminal device, where the information is sent by the terminal device to the network device.

When the above communication device is a chip applied to the network device, the chip of the network device implements the functions of the network device in the above method embodiments. The chip of the network device receives information from other modules (such as RF modules or antennas) in the network device, where the information is sent by the terminal device to the network device. Alternatively, the chip of the network device sends information to other modules (such as RF modules or antennas) in the network device, where the information is sent by the network device to the terminal device.

It should be understood that the processor in the embodiments of the present disclosure may be a central processing unit (CPU), a general-purpose processor, a digital signal processor (DSP), an application specific integrated circuits (ASIC), a field programmable gate array (FPGA), or a programmable logic device, a transistor logic device, a hardware component, or any combination thereof. A general-purpose processor may be a microprocessor or any conventional processor.

The operations of the methods in the embodiments of the present disclosure may be implemented by hardware or software instructions executed by the processor. The software instructions may be composed of corresponding software modules, which may be stored in random access memory (RAM), flash memory, read-only memory (ROM), programmable ROM (PROM), erasable PROM (EPROM), electrically EPROM (EEPROM), registers, hard disk, portable hard disk, CD-ROM, or the storage medium of any other forms being well-known in the art. An exemplary storage medium is coupled to the processor, to enable the processor to read information from and write information to the storage medium. Of course, the storage medium may also be a component of the processor. The processor and the storage medium may be disposed in the ASIC. In addition, the ASIC may be disposed in the network device or the terminal devices. Of course, the processor and the storage medium may also be implemented as discrete components in the network device or the terminal device.

The above embodiments may be fully or partially implemented by software, hardware, firmware, or any combination thereof. When implemented using software, the embodiments may be fully or partially implemented in the form of computer program products. The computer program products include one or more computer programs or instructions. When loading and executing the computer program or instructions on a computer, all or part of the processes or functions described in the embodiments of the present disclosure are executed. The computer may be a general-purpose computer, a specialized computer, a computer network, or other programmable devices. The computer programs or instructions may be stored in a computer-readable storage medium or be transmitted through the computer-readable storage medium. The computer-readable storage medium may be any available medium that the computer can access, or a data storage device such as a server integrated with one or more available mediums. The available mediums may be magnetic mediums, such as floppy disks, hard disks, magnetic tapes, or be optical mediums, such as DVD, or be semiconductor mediums, such as solid state disks (SSDs).

In the embodiments of the present disclosure, if there is no special explanation or logical conflict, the terms and/or descriptions in different embodiments are consistent and may be mutually referenced. The technical features in different embodiments may be combined to form new embodiments depending on their inherent logical relationships.

In the present disclosure, "at least one" refers to one or more, and "a plurality of" refers to two or more. "And/or" describes the association relationships between the associated objects, and indicates that there may be three types of relationships. For example, A and/or B may represent the situations where A exists alone, A and B exist simultaneously, and B exists alone, where A and B may be singular or plural. In the textual description of the present disclosure, the character "/" generally indicates that the relationship between the associated objects is "or".

It should be understood that various numerical numbers involved in the embodiments of the present disclosure are only for the convenience of description and are not intended to limit the scope of the embodiments of the present disclosure. The sequence numbers of the above-mentioned processes do not necessarily mean the order of execution, and the execution order of each process should be determined by its function and internal logic.

What is claimed is:

1. A method for paging, comprising:
receiving, by a first terminal device, system information sent by a network device, wherein the system information includes information indicating whether the network device supports group paging corresponding to transmit beam;
receiving, by the first terminal device of a plurality of terminal devices, paging indication information sent by the network device, wherein the paging indication information includes identification information of one or more terminal devices of the plurality of terminal devices, wherein the one or more terminal devices are paged by the network device, and the plurality of terminal devices corresponds to a first beam;
determining, by the first terminal device, whether the first terminal device is paged by the network device according to the identification information; and
in response to the first terminal device being paged by the network device, sending, by the first terminal device, a paging response message to the network device, wherein the paging response message indicates that the first terminal device is a terminal device being paged by the network device.

2. The method according to claim 1, wherein the paging response message includes a reported beam strength of a second beam, wherein the second beam has a strongest beam strength among a plurality of beams detected by the first terminal device at a first moment.

3. The method according to claim 2, further comprising:
determining, by the first terminal device, the reported beam strength of the second beam included in the paging response message according to beam strength of the second beam detected at a second moment, beam strength of the second beam detected at the first moment, and a forgetting factor, wherein the second moment is a previous moment of the first moment.

4. The method according to claim 3, further comprising:
receiving, by the first terminal device, a physical downlink control channel (PDCCH) and a physical downlink shared channel (PDSCH) sent through a target beam, wherein the target beam is determined based on the second beam.

5. The method according to claim 1, further comprising:
wherein the information indicates a number of supported paging groups.

6. The method according to claim 5, wherein receiving, by the first terminal device of the plurality of terminal devices, the paging indication information sent by the network device, includes:
in response to the information indicating that the network device supports group paging based on transmit beam, receiving, by the first terminal device, the paging indication information sent by the network device.

7. The method according to claim 4, wherein the target beam is configured for paging for different groups according to user groups, and paging information is sent to a target user group through the target beam, to page a target terminal device.

8. The method according to claim 6, wherein receiving, by the first terminal device of the plurality of terminal devices, the paging indication information sent by the network device, includes:
receiving, by the first terminal device, a paging message sent by the network device, wherein the paging message includes the paging indication information and paging resource information, and wherein the paging resource information indicates a size of a resource required by the network device.

9. The method according to claim 8, further comprising:
determining, by the first terminal device, an uplink resource according to the paging resource information;
wherein in response to the first terminal device being paged by the network device, sending, by the first terminal device, the paging response message to the network device, includes:
sending, by the first terminal device, the paging response message to the network device, wherein the paging response message indicates the uplink resource.

10. A method for paging, comprising:
sending, by a network device, system information, wherein the system information includes information indicating whether the network device supports group paging corresponding to transmit beam;
sending, by the network device, paging indication information to a plurality of terminal devices, wherein the paging indication information includes identification information of one or more terminal devices of the plurality of terminal devices, wherein the one or more terminal devices are paged by the network device, and the plurality of terminal devices corresponds to a first beam;
receiving, by the network device, a paging response message sent by a first terminal device of the plurality of terminal devices; and
paging, by the network device, the first terminal device according to the paging response message sent by the first terminal device.

11. The method according to claim 10, wherein the paging response message includes a reported beam strength of a second beam and a forgetting factor, wherein the forgetting factor is used to determine before-filtering beam strength of the second beam, and the second beam has a strongest beam strength among a plurality of beams detected by the first terminal device at a first moment,
wherein the method further comprises:
determining, by the network device, a target beam matching with the first terminal device according to the reported beam strength of the second beam.

12. The method according to claim 11, further comprising:
sending, by the network device, paging information for different groups to a target user group through the target beam according to user groups, to page a target terminal device.

13. The method according to claim 12, further comprising:
sending, by the network device, a PDCCH and a PDSCH to the first terminal device through the target beam.

14. The method according to claim 10, wherein before sending, by the network device, the paging indication information to the plurality of terminal devices, the method further comprises:
wherein the information indicates a number of paging groups supported by the network device.

15. The method according to claim 14, wherein sending, by the network device, the paging indication information to the plurality of terminal devices, comprises:
sending, by the network device, a paging message to the plurality of terminal devices, wherein the paging message includes the paging indication information and paging resource information, and wherein the paging resource information indicates a size of a resource required by the network device.

16. The method according to claim 15, wherein the paging response message indicates an uplink resource determined according to the paging resource information.

17. A first terminal device, comprising:
at least one processor; and
a memory being in communication connection with the at least one processor;
wherein the memory stores instructions, that, when executed by the at least one processor, cause the at least one processor to perform following operations:
receiving, by the first terminal device, system information sent by a network device, wherein the system information includes information indicating whether the network device supports group paging corresponding to transmit beam;
receiving, by the first terminal device of a plurality of terminal devices, paging indication information sent by the network device, wherein the paging indication information includes identification information of one or more terminal devices of the plurality of terminal devices, wherein the one or more terminal devices are paged by the network device, and the plurality of terminal devices corresponds to a first beam;
determining, by the first terminal device, whether the first terminal device is paged by the network device according to the identification information; and
in response to the first terminal device being paged by the network device, sending, by the first terminal device, a paging response message to the network device, wherein the paging response message indicates that the first terminal device is a terminal device being paged by the network device.

18. The first terminal device according to claim 17, wherein the paging response message includes a reported beam strength of a second beam, wherein the second beam has a strongest beam strength among a plurality of beams detected by the first terminal device at a first moment.

19. The first terminal device according to claim 18, the operations further comprising:
determining, by the first terminal device, the reported beam strength of the second beam included in the paging response message according to beam strength of the second beam detected at a second moment, beam strength of the second beam detected at the first moment, and a forgetting factor, wherein the second moment is a previous moment of the first moment.

20. The first terminal device according to claim 18, the operations further comprising:
receiving, by the first terminal device, a physical downlink control channel (PDCCH) and a physical downlink shared channel (PDSCH) sent through a target beam, wherein the target beam is determined based on the second beam.

* * * * *